United States Patent [19]

Sato et al.

[11] Patent Number: 4,753,424
[45] Date of Patent: Jun. 28, 1988

[54] METHOD OF CLAMPING RAILS FOR PRESSURE WELDING THE SAME AND CLAMPING APPARATUS THEREFOR

[75] Inventors: Yukihiko Sato, Tsu; Eiji Morishige, Hisai; Saburo Mori, Yokohama; Masaharu Sekino, Odawara; Akio Mitsui, Zama, all of Japan

[73] Assignee: Nippon Kokan Kabushiki Kaisha, Tokyo, Japan

[21] Appl. No.: 21,322

[22] Filed: Mar. 3, 1987

[30] Foreign Application Priority Data

Mar. 5, 1986 [JP] Japan .................................. 61-46074
Nov. 7, 1986 [JP] Japan ................................. 61-264077

[51] Int. Cl.⁴ .............................................. B25B 1/20
[52] U.S. Cl. ...................................... 269/43; 269/152; 269/156; 269/164
[58] Field of Search ................... 269/43, 87, 152, 290, 269/288, 87, 238, 156, 164; 228/49 B, 49 R, 49 A, 49 C, 47, 44.1, 44.5; 254/43, 44; 219/53, 54, 55, 158, 161; 104/15

[56] References Cited

U.S. PATENT DOCUMENTS

| | | | |
|---|---|---|---|
| 4,313,382 | 2/1982 | Bommart | 269/43 |
| 4,320,708 | 3/1982 | Bommart | 269/43 |
| 4,641,818 | 2/1987 | Bommart | 269/43 |
| 4,674,730 | 6/1987 | Roberts | 269/43 |

FOREIGN PATENT DOCUMENTS 56-136292 10/1981 Japan .

*Primary Examiner*—Robert C. Watson
*Attorney, Agent, or Firm*—Fleit, Jacobson, Cohn & Price

[57] ABSTRACT

When forcing together the mating end faces of a pair of rails into contact and pressure welding the rails, the clamping operation of each rails end is effected by dividing it into a vertical positioning clamping and a lateral positioning clamping performed independently of the former. With the contacting end faces being interposed, each of the two rail ends is first forced upward at the chins of each rail below the head thereof to press the upper surface of each rail against the lower surface of a leveler which establishes a preliminarily adjusted reference level. Then, each of the rail ends is clamped by a pair of clamping means which are pressed against the sides of the web of the rail from both sides. At this time, one of the clamping means pressed against one side of the rail web forces the rail web to a preliminarily adjusted reference position with a relatively strong force and the other clamping means pressed against the other side of the web forces the web in the opposing direction with a weaker force.

5 Claims, 2 Drawing Sheets

METHOD OF CLAMPING RAILS FOR PRESSURE WELDING THE SAME AND CLAMPING APPARATUS THEREFOR

BACKGROUND OF THE INVENTION

1. Field of the Invention

The present invention relates to a method of clamping a pair of rails in the proper relative positional relation when pressure welding the rails at their end faces and a clamping apparatus for performing the method.

2. Description of the Prior Art

The joining conditions of a joint obtained by pressure welding a pair of rails at their end faces or the joint conditions such as the occurrence of any lateral displacement or variation in the level of the upper surface of the joint and the straightness of the joint have great effects on the riding confortability in a trolley, running stability, the magnitude of noize, etc., and particularly greater accuracy is required for the joints of rails on which the trolley is run at high speeds. Such defects of the rail joint are due to the manufacturing accuracy of the rails themselves or the clamping accuracy of the rails before their pressure welding and therefore the rails to be joined must be properly placed end to end in the correct relative positional relation by absorbing the manufacturing accuracy of the rails, particurly variations in the bend of the rails during clamping of the rails prior to their welding.

On example of this type of method and apparatus for clamping a pair of rails during their pressure welding is disclosed, for example, in Japanese Laid-Open Patent Application No. 56-136292 assigned to the assignee of the present application. However, since this conventional clamping method employs a system of simultaneously effecting the vertical and lateral clamping a pair of rails by a single hydraulic cylinder unit through link means, during the clamping operation the hydraulic cylinder unit must be operated after both of vertical position adjustments and lateral position adjustments of the rails with respect to each other have been completed and particularly the lateral position adjusting operation required that the operator crawls under the pressure welding machine to replace the pair of clamping jaws bolted to clamping means or insert adjusting spacers for lateral position adjusting purposes. Since this operation is repeated several times along with an operation of confirming the straightness of the pair of rails, since usually as long as about 10 minutes are required for properly clamping the rails in a straight line and since the following pressure welding itself is completed in only a few minutes, there is a disadvantage that almost all the time for the whole operation must be spent for the position adjusting operation of the rails.

SUMMARY OF THE INVENTION

It is an object of the present invention to provide a rail clamping method and apparatus designed to overcome the foregoing deficiencies in the prior art and particularly capable of easily and rapidly performing the vertical and lateral position adjusting operation of a pair of rails relative to each other.

In accordance with the invention, the above object is a accomplished by dividing the clamping of each rail end into a vertical positioning clamping and a lateral positioning clamping which is performed independently of the former.

Specifically, in accordance with one aspect of the method according to the invention, with their contacting end faces being interposed, two rail ends are first positioned vertically so that the end of each rail is forced upward at the chins of the rail below its head and the upper surface of the rail is pressed against the lower surface of a leveler which provides a preliminarily adjusted reference level. Then, the rail ends are each clamped at the sides of the rail web by a pair of clamping means which hold the web from the both sides in such a manner that one of the clamping means contacting one side of the rail web presses the rail web into a preliminarily adjusted reference position with a relatively strong force and the other clamping means contacting the other side presses the rail web in the opposing direction with a weaker force.

In accordance with the method of this invention, the straightness of the rails in the vertical direction can be adjusted to the desired accuracy by adjusting the reference level established by the lower surface of each levelar at each of the rail ends prior to the clamping. Also, the lateral straightness of the rails can be similarly adjusted to the desired accuracy by adjusting the reference position established by the stroke end of the clamping means at each rail end prior to the clamping.

The apparatus for performing the method of this invention includes a pair of clamping heads for clamping a pair of rails with their contacting end faces being interposed, and the clamping heads are relatively movable toward and away from each other only in one direction corresponding to the lengthwise direction of the rails. Each clamping head includes a leveler for establishing a vertical reference level at its lower surface, hydraulic means adapted for contact with the side chins of the rail below its head to force the rail upward, first clamping means adapted to be pressed agaist one side of the web of the rail to force the rail web up to a preliminarily adjusted stroke end or reference position, and second clamping means adapted to be pressed against the other side of the rail web to force the rail web against the first clamping means with a weaker force. Preferably, the lower surface of the leveler and those portions of the hydraulic means which contact with the rail chin portions are adapted to make some sliding movements relative to the rail so as to permit small lateral movements of the rail without causing the hydraulic means to appreciably decrease its push-up force. On the other hand, the forward ends of the first and second clamping means are adapted so as to firmly hold the rail web therebetween without any sliding. In one preferred form, each of the clamping means includes hydraulic cylinder unit and clamping jaws attached to the forward ends of the piston rods of the cylinder units. The hydraulic cylinder units of the first clamping means have adjustable stroke-end positions and concretely this can be accomplished by arranging, for example, hydraulic cylinder units of the fixed stroke length type so as to be adjustable in position.

The above and other objects, features and advantage of the invention will become more apparent from the following description of its preferred embodiments given by way of example and not limitation in conjunction with the accompanying drawings.

DESCRIPTION OF THE PREFERRED EMBODIMENTS

Figure 1:
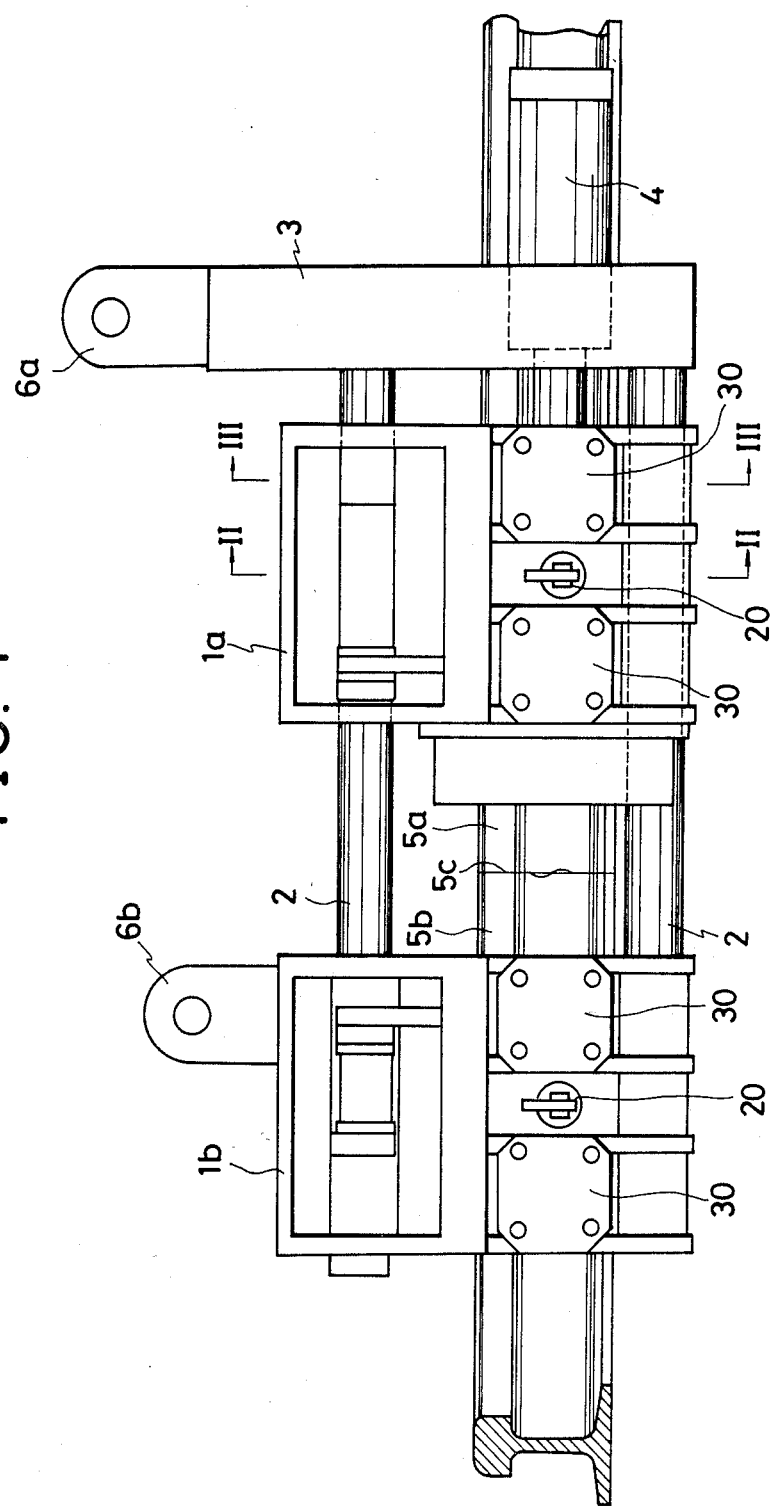
FIG. 1 is a side view showing a rail clamping apparatus according to an embodiment of the present invention.
Figure 2:
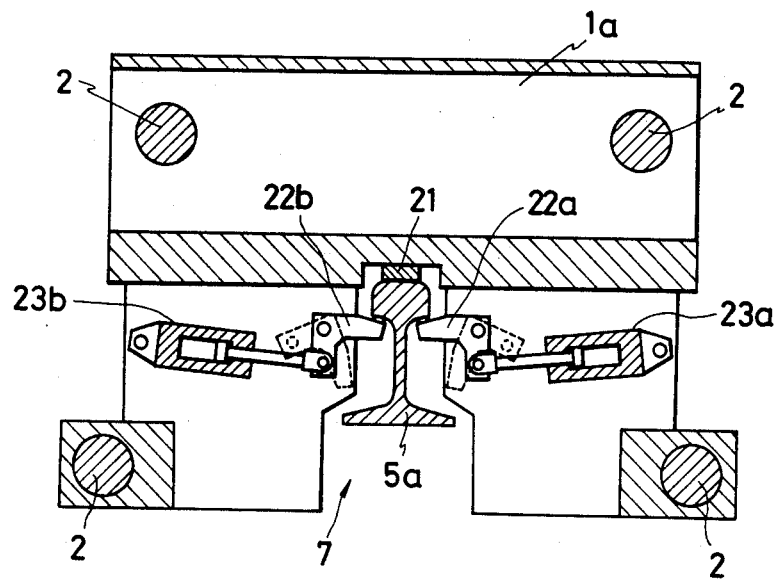
FIG. 2 is a view looked in the direction of the arrowed line II—II of FIG. 1.
Figure 3:
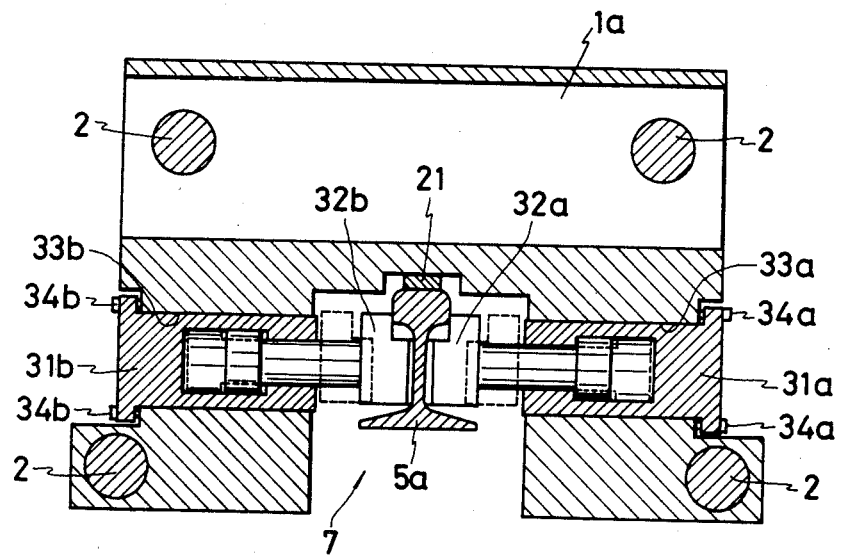
FIG. 3 is a view looked in the direction of the arrowed line III—III of FIG. 1.

FIGS. 1 to 3 show schematically a rail clamping apparatus according to an embodiment of the invention. In the Figures, a pair of rails 5a and 5b are placed so as to contact at their end faces, and a pair of straddle-type clamping heads 1a and 1b of the substantially the same construction are respectively mounted on the rails 5a and 5b to clamp their ends. The clamping head 1a is movable and the other clamping head 1b is fixed. The fixed clamping head 1b is fixedly mounted on one end of each of a plurality of guide bars 2 which are directed in the rail lengthwise direction and the other ends of the guide bars 2 are fitted in a frame 3. The movable clamping head 1a is guidably supported on the guide bars 2 between the fixed clamping head 1b and the frame 3, and the movable clamping head 1a is movable toward and away from the fixed clamping head 1b for pressure welding purposes by a cylinder unit 4 attached to the frame 3. Numerals 6a and 6b designate hanging pieces for lifting the whole clamping apparatus by a crane.

The clamping heads 1a and 1b are substantially the same in construction and therefore only the construction of the clamping head 1a will now be described.

The clamping head 1a includes a vertical positioning mechanism 20 of the type shown in FIG. 2 and lateral positioning clamping mechanisms 30, 30 of the type shown in FIG. 3. The Pair of lateral positioning clamping mechanisms 30 and the vertical positioning mechanism 20 are arranged in a line in the rail lengthwise direction such that the vertical positioning mechanism 20 is placed between the other two as shown in FIG. 1.

As shown in FIG. 2, the vertical positioning mechanism 20 includes a leveler 21 attached to the central lower surface of a straddle space 7 of the head 1a so as to be located in a predetermined vertical position, push-up rocking pieces 22a and 22b pivotably attached to the sides of the straddle space 7, and hydraulic cylinder units 23a and 23b for pivoting the rocking pieces 22a and 22b, respectively, in a symmetrical manner. The rocking pieces 22a and 22b are pivoted by the extending operation of the piston rods of the hydraulic cylinder units 23a and 23b so as to force the chins of the rail 5a below its head upward from below and press the upper surface of the rail 5a against the lower surface of the leveler 21. In this case, the lower surface of the leveler 21 should preferably be a surface which does not cause any considerable friction with the rail upper surface and those portions of the pieces 22a and 22b which contact the rail chins should preferably be formed with low-friction surfaces so as to permit some sliding movements relative to the rail.

As shown in FIG. 3, each of the lateral positioning clamping mechanisms 30 includes a pair of hydraulic cylinder units 31a and 31b attached to the sides of the straddle space 7 of the head 1a, and clamping jaws 32a and 32b mounted on the forward ends of the piston rods of the hydraulic cylinder units 31a and 31b. The clamping jaws 32a and 32b hold the web of the rail 5a without any slide from its sides with their end faces, thereby clamping the rail. The hydraulic cylinder unit 31a produces for example an output of $40 \times 10^3$ kgf/cm$^2$ and the clamping jaw 32a establishes a lateral reference position of the rail at the extended stroke end of the unit 31a. For the purpose of adjusting this reference position, the hydraulic cylinder unit 31a is attached to the head 1a so as to be adjustable in position. The other hydraulic cylinder unit 31b produces a relatively low output of $35 \times 10^3$ kgf/cm$^2$, for example. In the illustrated embodiment, the hydraulic cylinder unit 31a and 31b are respectively fitted in cylindrical cavities 33a and 33b formed in the head 1a and are then fastened at their tail-end flanges with bolts 34a and 34b. The position of the hydraulic cylinder unit 31a can be adjusted by using for example headed bolts for the bolts 34a fastening the flange to the head 1a and adjusting the amount of bolting of these bolts.

Then, with the clamping apparatus constructed as described above, the clamping operation of the rails for their pressure welding is performed as follows. Firstly, the levelers 21 of the clamping heads 1a and 1b are adjusted to the same level and also the bolts 34a are adjusted to adjust the stroke-end positions of the hydraulic cylinder units 31a of the clamping heads 1a and 1b in such a manner that the positions of the forward end faces of the clamping jaws 32a are registered in the heads 1a and 1b.

Then, the clamping heads 1a and 1b are mounted to straddle from above the ends of the rails 1a and 1b arranged to contact their end faces, thereby placing a joint 5c of the end faces between the heads 1a and 1b (FIG. 1). Then, in each of the heads 1a and 1b, the cylinder units 23a and 23b of the vertical positioning mechanism 20 are extended to pivot the rocking pieces 22a and 22b so that the chins of the rails 5a and 5b below their heads are forced upward from below by the rocking piece forward ends and the upper surfaces of the rails 5a and 5b are pressed against the corresponding levelers 21 (FIG. 2). In this way, the vertical straightness of the rails 5a and 5b is ensured.

With this pressed condition being maintained, the two pairs of hydraulic cylinder units 31a and 31b of each of the clamping heads 1a and 1b on the sides of each rail are all extended and the web of each rail is held from the sides by the clamping jaws 32a and 32b. Since the output of the hydraulic cylinder units 31a on one side of the rail are greater than those of the hydraulic cylinder units 31b on the other side, the hydraulic cylinder units 31a are extended to their stroke ends to bring the web surface on one rail side to the reference position. In this way, the lateral straightness of the two rails is ensured and simultaneously the rails are clamped hydraulically from the opposite side by the hydraulic cylinder units 31b. In this case, if the outputs of the hydraulic cylinder units 31a and 31b are as mentioned previously by way of example, the clamping force becomes $35 \times 10^3$ kgf/cm$^2$. If any variation is caused in lateral position between the rails 5a and 5b, in one or the other of the heads 1a and 1b the positions of the hydraulic cylinder units 31a are subjected to a fine adjustment by means of the bolts 34a. This fine adjusting operation can be effected easily in a short period of time from the side of the rail. In the case of the actual operation, it is easy to effect any fine adjustment of the rails and therefore the adjusting time and the number of events of adjustment are decreased considerably than previously. The following Table 1 shows the adjusting time, the number of events of adjustment and the correcting time required until the straightness is enssured in the rail clamping operation according to each of the conventional method and the method of the invention. As will be seen from the Table, it has been confirmed that in accordance with the method of this invention the correcting time is reduced to about one fifth of the conventional method and there is a great effect in improving the operating efficiency.

TABLE 1

Comparative lateral rail correcting times of the conventional method and invention method

|  | Conventional method | Invention method |
| --- | --- | --- |
| Adjusting time (min/event) | 5-10 | 2-3 |
| Number of adjusting events (number) | 2-3 | 1-2 |
| Correcting time (min) | 10-30 | 2-6 |

We claim:

1. A clamping apparatus for clamping a pair of rails in a proper relative positional relation when pressure welding said rails at end faces thereof, said apparatus comprising:

a pair of clamping heads at least one of which is movable toward and away from the other in one direction corresponding to a lengthwise direction of said rails, said clamping heads being adapted to clamp ends of said rails with said end faces in contact being interposed;

each of said clamping heads including a leveler for establishing a vertical reference level at a lower surface thereof, hyraulic pressure means adapted to be pressed against side chins of one of said rails below a head thereof to force said one rail upward, first clamping means adapted to be pressed against one side of a web of said one rail to force said rail web to a preliminarily adjusted stroke-end reference position, and second clamping means adapted to be pressed against the other side of said rail web to force said rail web with a weaker force against said first clamping means.

2. An apparatus according to claim 1, wherein a lower surface of said leveler and portions of said hydraulic pressure means contacting the chins of said one rail are slightly slidable relative to said one rail to permit a small lateral movement thereof without appreciably decreasing the push-up force of said hydraulic pressure means, and wherein each of said first and second clamping means includes forward-end structure means adapted to firmly hold the web of said one rail without sliding.

3. An apparatus according to claim 1, wherein each of said first and second clamping means includes a plurality of hydraulic cylinder means, and a plurality of clamping jaws each thereof being mounted on a forward end of a piston rod of one of said hydraulic cylinder means.

4. An apparatus according to claim 3, wherein each of said plurality of hydraulic cylinder means forming said first clamping means has an adjustable stroke-end position.

5. An apparatus according to claim 4, wherein each of said plurality of hydraulic cylinder means forming said first clamping means comprises a hydraulic cylinder unit having a fixed stroke length and mounted so as to be adjustable in position.

* * * * *